United States Patent
Kim et al.

(10) Patent No.: US 8,588,973 B2
(45) Date of Patent: Nov. 19, 2013

(54) APPARATUS AND METHOD FOR EXECUTING ROBOT TASK USING ROBOT MODEL DEFINITION

(75) Inventors: Rock-Won Kim, Daejeon (KR); Seung-Ik Lee, Daejeon (KR); Jun-Yong Sung, Seoul (KR); Sung-Hoon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 455 days.

(21) Appl. No.: 12/963,220

(22) Filed: Dec. 8, 2010

(65) Prior Publication Data
US 2011/0153074 A1 Jun. 23, 2011

(30) Foreign Application Priority Data

Dec. 18, 2009 (KR) .................. 10-2009-0127079
Jun. 1, 2010 (KR) .................. 10-2010-0052035

(51) Int. Cl.
*G05B 19/04* (2006.01)
*G06F 19/00* (2011.01)

(52) U.S. Cl.
USPC ............... 700/246; 700/249; 700/250; 901/1; 901/46; 901/31; 717/114; 318/568.1

(58) Field of Classification Search
USPC ........... 700/245, 247, 246, 248, 249, 253, 79; 901/50, 1, 46, 31; 717/114, 100; 318/568.1
See application file for complete search history.

(56) References Cited

FOREIGN PATENT DOCUMENTS

| JP | 5-119824 | 5/1993 |
|---|---|---|
| KR | 10-2009-0093652 | 9/2009 |

OTHER PUBLICATIONS

Martin Loetzsch et al., "XABSL-A Pragmatic Approach to Behavior Engineering," IEEE/RSJ International Conference of Intelligent Robots and Systems (IROS), 2006.

*Primary Examiner* — Ronnie Mancho
(74) *Attorney, Agent, or Firm* — Staas & Halsey LLP (57) ABSTRACT

Provided is an apparatus for executing a robot task using a robot model definition. A task execution apparatus include: a storage unit to store at least one robot model, at least one robot behavior, and at least one robot task; and a task execution unit to generate at least one execution object from the stored at least one robot model, at least one robot behavior, and at least one robot task, and to execute a task of a robot from a corresponding execution object among the generated at least one execution object in response to an execution command input from a user.

20 Claims, 7 Drawing Sheets

```
Model obstacle{
    sym float sonar1;
    sym float sonar2;

void setMode(int);
    action void start();

state obsOnleft  = sonar1<20;
    state obsOnright = sonar2<20;
    state obsAll = obsOnleft && obsOnright;
}

Model arm{
    action setElbowRoll(float);
    action setElbowPitch(float);

float getCurElbowAngle();
    state elbowUp = getCutElbowAngle() > 1.5;
}

Model voice{
    action speak(string, int);
}

Model wheel{
    action goForward(float);
    action turnLeft(float);
    action turnRight(float);
    action stop();

bool    iswheelActive();
}

Model taskCtx{
    var bool targetPerformed;
    context controv = wheel.iswheelActive() && obstacle.obsAll;
}
```

FIG.8

```
Behavior bhv1(){

Decision{
        if(obstacle.obsOnLeft)
            goto L1;
        if(obstacle.obsOnRight)
            goto L2;
        if(taskCtx.controv)
            goto L3;
        else{
            int mode = 3;
            bhv2(3);
        }
    } activity L1:
        wheel.turnRight(0.5);

activity L2:
        wheel.turnLeft(0.5);

activity L3:
        parallel{
            with:
                wheel.stop();
            with:
                voice.speak("Be careful", 1);

}
}

Behavior bhv2(int var){
    Decision{
        ...
    }
    label L1:
        ...
}
```

FIG.9

```
Task task1{
    repeat{
        if(taskCtx.targetPerformed)
            exit;
        else
            bhv1();
    }
}
```

APPARATUS AND METHOD FOR EXECUTING ROBOT TASK USING ROBOT MODEL DEFINITION

CROSS REFERENCE TO RELATED APPLICATIONS

This application claims priority to Korean Patent Application Nos. 10-2009-0127079 and 10-2010-0052035 filed on Dec. 18, 2009 and Jun. 1, 2010, respectively, the entire contents of which are herein incorporated by reference.

BACKGROUND OF THE INVENTION

1. Field of the Invention

The present invention relates to a robot interface technology, and more particularly, to an apparatus and method for executing a robot task that may execute a robot task using a world model definition of a robot.

2. Description of the Related Art

A conventional scheme of describing a task in a robot or a machine includes a scheme of describing a task using a programming language, for example, a programming language such as c/c++, or a description scheme of expanding a syntax for task execution to an existing programming language.

When using the programming language such as c/c++, there are advantages in that a unification with an external application programming interface (API) is convenient, a variety of functions provided from c/c++ may be easily included, and an execution speed is fast.

However, in the case of such task description scheme, a describer should directly describe all the tasks performed by a robot through programming and thus, an amount of programming may considerably increase, and modification and update of tasks may be inconvenient.

To overcome the above drawbacks, a scheme of describing a task using a robot-exclusive task language has been proposed. However, this scheme needs an interpret unit that can define and interpret a syntax of task language and thus, a configuration of the robot becomes complex.

In addition, an interoperation with various APIs, distributed by robot manufacturers, becomes an issue.

SUMMARY OF THE INVENTION

The present invention has been made in an effort to provide a robot task execution apparatus that may execute a robot task interoperating with various robot application programming interfaces (APIs) using a robot model defined by a user.

Further, the present invention has been made in an effort to provide a task execution method of the robot task execution apparatus.

An exemplary embodiment of the present invention provides an apparatus for executing a robot task, the apparatus including: a storage unit to store defined at least one robot model, at least one robot behavior, and at least one robot task; and a task execution unit to generate at least one execution object from the stored at least one robot model, at least one robot behavior, and at least one robot task, and to execute a task of a robot from a corresponding execution object among the generated at least one execution object in response to an execution command input from a user.

Another exemplary embodiment of the present invention provides a method of executing a robot task, the method including: generating at least one execution object from and stored at least one robot model, at least one robot behavior, and at least one robot task; and executing a task of a robot from a corresponding execution object among the at least one execution object in response to an execution command input from a user.

According to the exemplary embodiments of the present invention, an apparatus and method for executing a robot task may provide a user with convenience of a robot task technology by executing a briefly defined robot model, a robot behavior, or a robot task according to an interpret unit scheme regardless of a user robot API. Also, the user's frequent modification, update, and the like with respect to the robot task may be enabled.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENTS

The accompanying drawings illustrating exemplary embodiments of the present invention and contents described in the accompanying drawings should be referenced in order to fully appreciate operational advantages of the present invention and objects achieved by the exemplary embodiments of the present invention.

Hereinafter, the present invention will be described in detail by describing exemplary embodiments of the present invention with reference to the accompanying drawings. Like elements refer to like reference numerals shown in the drawings.

Figure 1:
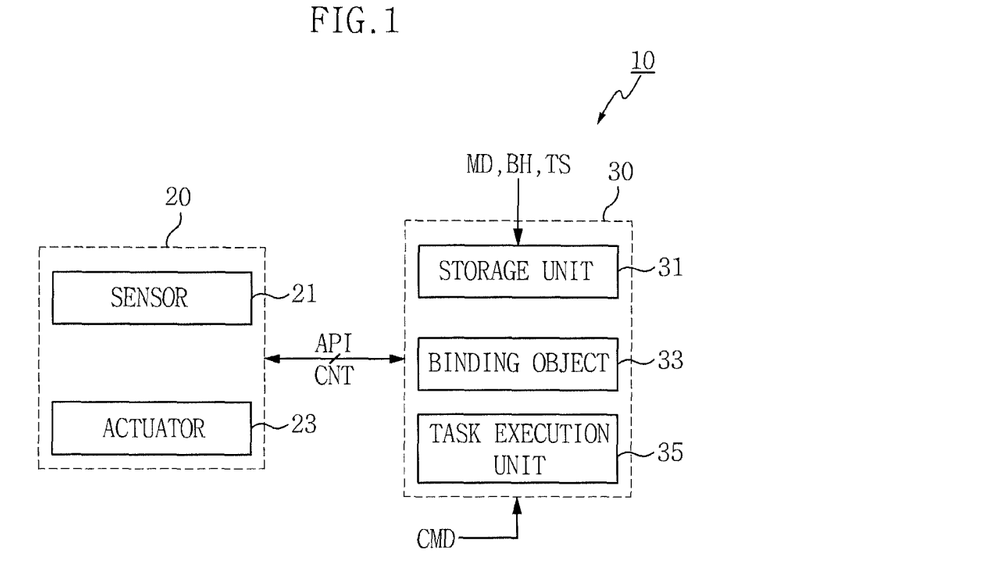
FIG. 1 is a schematic configuration diagram of a robot system including a robot task execution apparatus according to an exemplary embodiment of the present invention.
Figure 2:
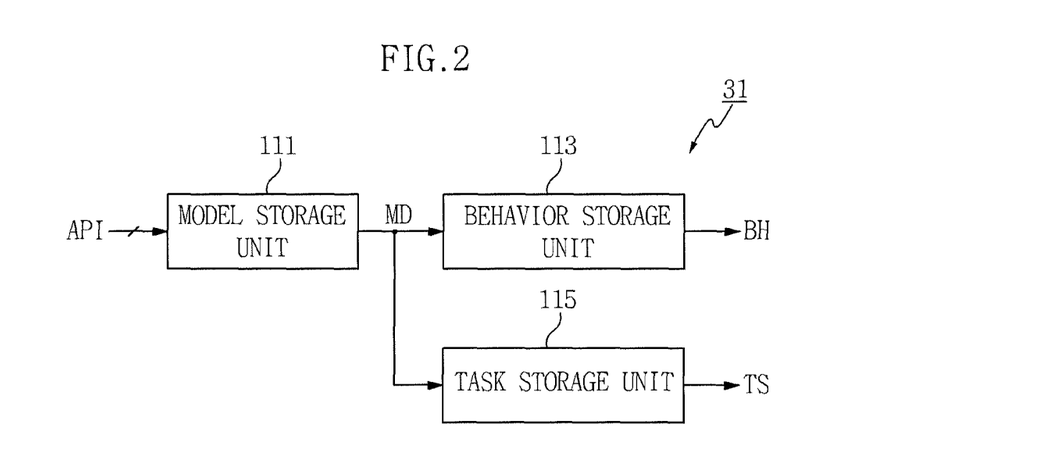
FIG. 2 is a configuration diagram of a storage unit of the robot task execution apparatus of FIG. 1.
Figure 3:
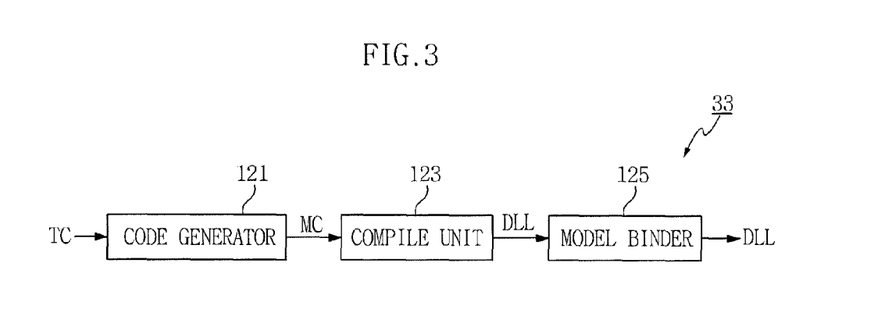
FIG. 3 is a configuration diagram of a binding object of the robot task execution apparatus of FIG. 1.
Figure 4:
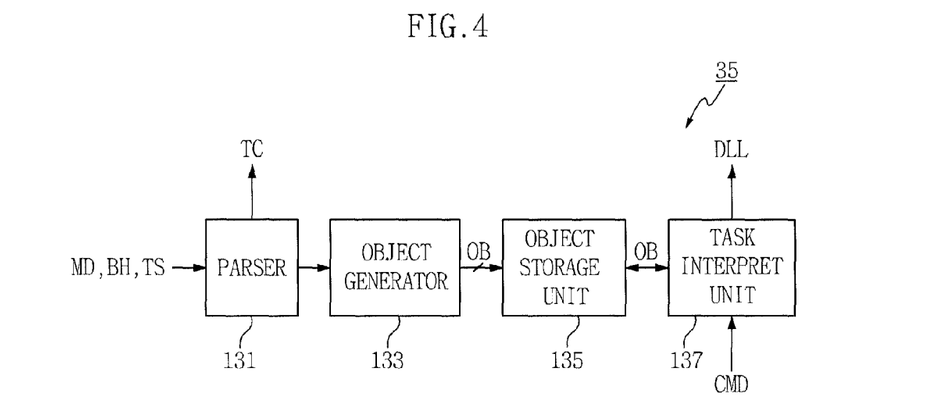
FIG. 4 is a configuration diagram of a task execution unit of the robot task execution apparatus of FIG. 1.

FIG. 1 is a schematic configuration diagram of a robot system including a robot task execution apparatus according to an exemplary embodiment of the present invention, FIG. 2 is a configuration diagram of a storage unit of the robot task execution apparatus of FIG. 1, FIG. 3 is a configuration diagram of a binding object of the robot task execution apparatus of FIG. 1, and FIG. 4 is a configuration diagram of a task execution unit of the robot task execution apparatus of FIG. 1.

Referring to FIG. 1, a robot system 10 may include an apparatus unit 20 and a task execution apparatus 30.

The apparatus unit 20 may include various apparatuses mounted in the robot system 10, for example, a sensor 21 and an actuator 23. An operation of the apparatus unit 20 may be controlled according to a control signal CNT output from the task execution apparatus 30.

The sensor 21 may output a sensing value according to operation of a robot. The sensor 21 may be a sensor for sensing a location of the robot such as an acceleration sensor, a direction sensor, and the like, or a sensor for sensing an environment where the robot is located, such as an ultrasonic sensor, an impact sensor, a tactile sensor, an imaging apparatus, and the like.

The sensor 21 may operate using a predefined sensor application programming interface (API). The sensor API may be distributed from a manufacturer of the robot system 10.

The actuator 23 may control the operation of the robot. The actuator 23 may be configured as a driving apparatus such as a servo motor and the like.

Also, the actuator 23 may operate using a predefined actuator API, which may be distributed from the manufacturer of the robot system 10.

The task execution apparatus 30 may include a storage unit 31, a binding object 33, and a task execution unit 35.

Referring to FIG. 1 and FIG. 2, the storage unit 31 may include a model storage unit 111, a behavior storage unit 113, and a task storage unit 115.

A variety of robot models MD defined by a user (or a task writer) may be stored in the model storage unit 111.

In this case, the user may define the plurality of robot models MD using a plurality of APIs provided from the apparatus unit 20, for example, a sensor API or an actuator API.

In addition, the user may randomly define the plurality of robot models MD using a physical or logical recognition target recognized by the robot and a variety of information obtained from the physical or logical recognition target.

Figure 7:
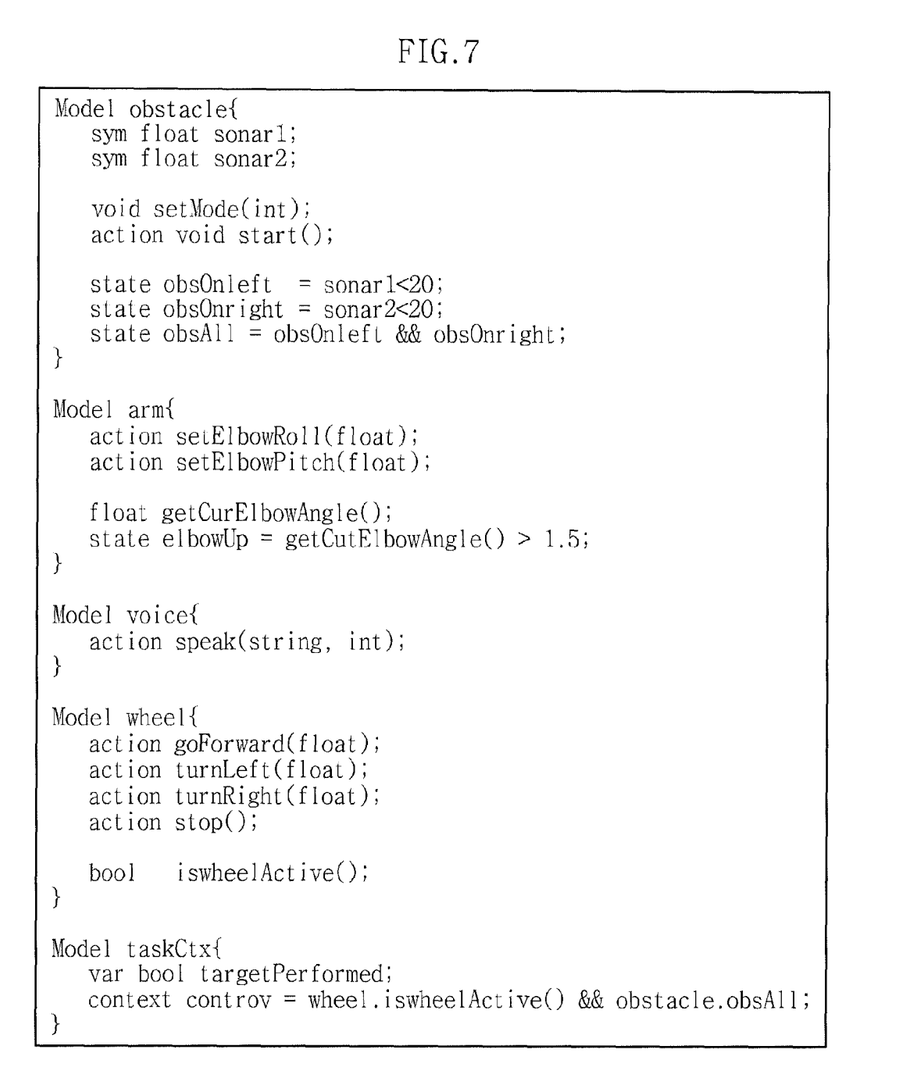
FIG. 7 is a diagram illustrating an exemplary embodiment of a defined robot model.

FIG. 7 is a diagram illustrating an exemplary embodiment of a defined robot model.

Referring to FIG. 1 and FIG. 7, the user may define a robot model MD based on a plurality of APIs obtained from the apparatus unit 20 or random information.

A single robot model MD may include a plurality of models. FIG. 7 illustrates an example where an obstacle detection model, an arm motion model, a voice output model, and a wheel movement model are included in the single robot model.

Also, each model may include a function, an action, a displacement, a symbol, and a state.

Here, the function and the symbol may correspond to means for obtaining information from an outside, the action may correspond to means for defining a behavior of the robot, and the displacement may correspond to means for defining a variable.

In addition, the state may correspond to means expressed as a logical expression equation using the function, the action, the displacement, and the symbol of the model. For example, in the arm motion model of FIG. 7, the state of arm.elbowUp may define a state where an arm of the robot is up using the function of getCurEblowAngle( ).

In the meantime, the user may define a new model by combining at least two models. For example, a taskCtx model of FIG. 7 may be a model defined by combining the obstacle detection model and the wheel movement model. A taskCtx. controv context included therein may define a circumstance where an obstacle is detected while a wheel of the robot is moving.

Referring again to FIG. 1 and FIG. 2, a plurality of robot behaviors BH defined based on the plurality of robot models MD by the user may be stored in the behavior storage unit 113.

Figure 8:
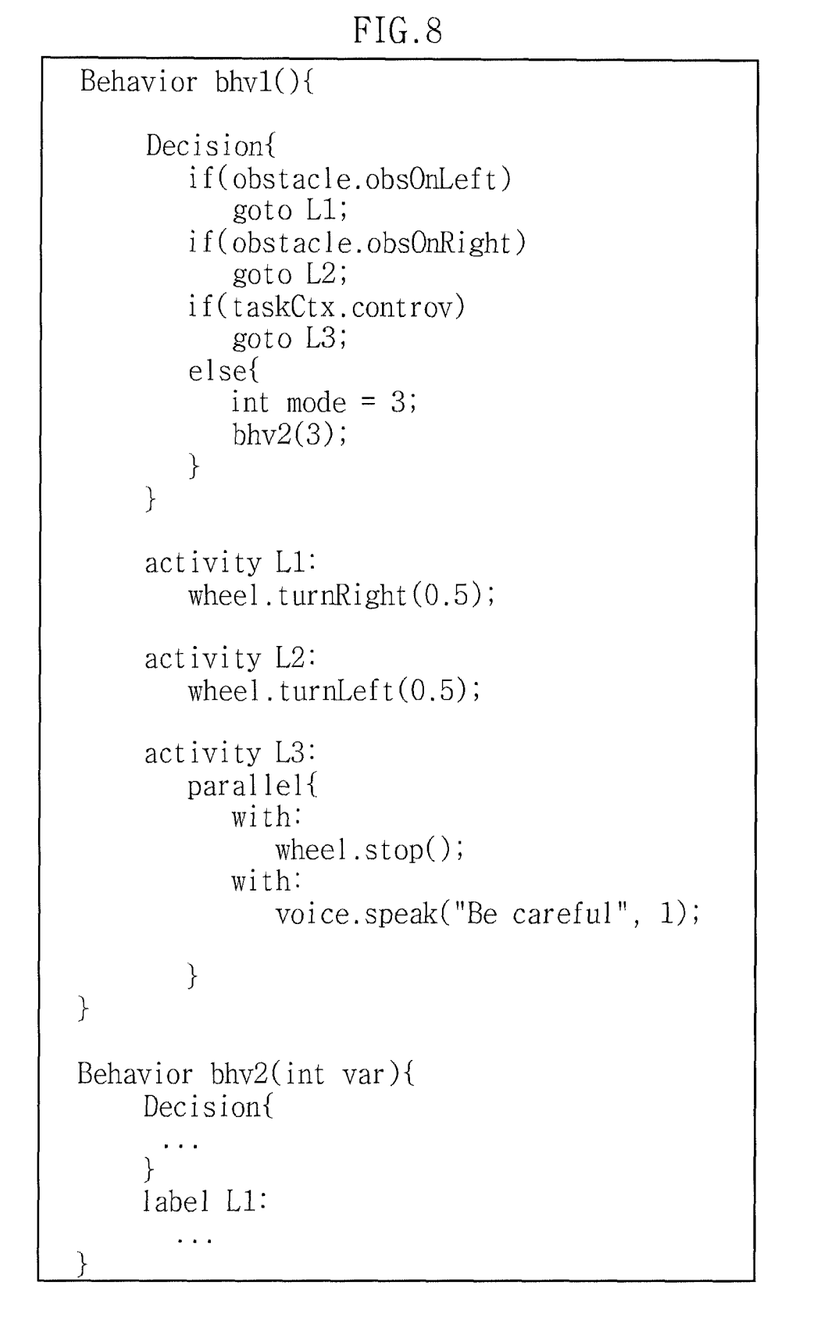
FIG. 8 is a diagram illustrating an exemplary embodiment of a defined robot behavior.

FIG. 8 is a diagram illustrating an exemplary embodiment of a defined robot behavior.

Referring to FIG. 1 and FIG. 8, the user may define a robot behavior BH based on a predefined robot model MD.

For example, in FIG. 8, robot behaviors BH called bhv1( ) and bhv2( ) are defined. It can be known that each of the robot behaviors BH is defined based on at least one model within the predefined robot model MD.

Each of the defined robot behaviors BH may include two portions, for example, a decision and an activity.

The decision may be defined using an 'if' function statement used in a general programming language.

The 'if' function statement included in the decision may be written using a function, a displacement, a symbol, state, and a context model of the robot model MD, however, an operational model of the robot model MD may not be included.

The activity may be defined to control an action of the robot when a particular condition is satisfied in the 'if' function statement of the decision.

The activity may be included in the decision, or may be separately defined. FIG. 8 illustrates an example where a plurality of activities are separately defined in a single decision.

Each activity may be written using the function, the displacement, the action, the symbol, the state, and the context model of the robot model MD. Each activity may include a value allocation statement, a parallel execution statement, an 'if' statement, a function call, a behavior call, and the like.

For example, in FIG. 8, robot behavior bhv1( ) defines a single decision using three 'if' function statements, and defines three activities performed when the respective corresponding 'if' function statements are satisfied.

Accordingly, in a case where the robot behavior bhv1( ) is referred to when a task is executed by the task execution apparatus 30, a corresponding activity may be executed by determining whether the three 'if' function statements of bhv1( ) are sequentially satisfied.

Also, when none of the three 'if' function statements of bvh1( ) are satisfied, a separately defined robot behavior bvh2( ) may be executed. Even in the defined robot behavior bvh2( ) the corresponding activity may be executed using the same scheme, that is, a scheme of determining whether an if function statement is satisfied.

Referring again to FIG. 1 and FIG. 2, a plurality of robot tasks TS defined based on the plurality of robot models MD by the user may be stored in the task storage unit 115.

Figure 9:
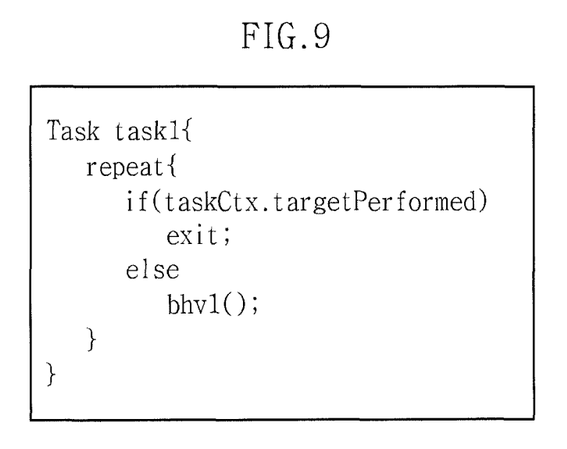
FIG. 9 is a diagram illustrating an exemplary embodiment of a defined robot task.

FIG. 9 is a diagram illustrating an exemplary embodiment of a defined robot task.

Referring to FIG. 1 and FIG. 9, the user may define a robot task (TS) based on a predefined robot model MD.

For example, in FIG. 9, it can be known that a robot task TS is defined using a taskCtx model of the robot model MD.

The robot task TS may be defined using a single repeat function statement. The repeat function statement may include an 'if' function statement.

Specifically, the robot task TS of FIG. 9 may be defined so that a predefined robot behavior, that is, a bhv1( ) behavior may be performed until a taskCtx.targetPerformed variable is true.

Here, a repeat condition of the robot task TS may be defined to be performed when a single activity of the robot behavior BH is executed.

Referring again to FIG. 1 and FIG. 2, the storage unit 31 may output a stored plurality of robot models MD, a plurality of robot behaviors BH, and a plurality of robot tasks TS to the task execution unit 35 or the binding object 33 according to a request from the task execution unit 35.

Referring to FIG. 1 and FIG. 3, the binding object 33 may generate and output a dynamic library DLL that may represent a value of the robot model MD from a template code TC that is provided from the task execution unit 35. The task execution unit 35 will be described later.

The binding object 33 may include a code generator 121, a compile unit 123, and a model binder 125.

The code generator 121 may generate and output a model code MC from the template code TC that is transmitted from the task execution unit 35.

For example, the code generator 121 may generate the model code MC using a scheme of filling inside the template code TC based on a variety of APIs input from the user or random information, and the like.

The compile unit 123 may generate the dynamic library DLL by compiling the model code MC output from the code generator 121.

The model binder 125 may output, to the task execution unit 35, the dynamic library DLL generated by the compile unit 123 according to a request of the task execution unit.

Referring to FIG. 1 and FIG. 4, in response to a user command CMD input from the user, for example, a task execution command, the task execution unit 35 may extract a single task from a stored plurality of robot tasks TS, and may execute the extracted task.

In this case, the task execution unit 35 may execute a robot behavior BH or a robot model MD associated with the extracted task.

The task execution unit 35 may include a parser 131, an object generator 133, an object storage unit 135, and a task interpret unit 137.

The parser 131 may parse and thereby output the stored robot model MD, the robot behavior BH, and the robot task TS stored in the storage unit 31.

In this case, the parser 131 may inspect an error of the robot model MD, the robot behavior BH, and the robot task TS, and may also perform a parsing operation according to an inspection result.

Also, the parser 131 may generate and thereby output a template code TC for binding with the aforementioned binding object 33.

The template code TC may be a basic code generated to obtain a model value of the robot model MD, and may be generated based on the parsed robot model MD.

The object generator 133 may generate an execution object OB from the parsed robot model MD, the parsed robot behavior BH, and the parsed robot task TS that are output from the parser 131.

Here, the execution object OB generated by the object generator 133 may be an object defining a class of the robot behavior BH or the robot task TS.

The object storage unit 135 may store at least one execution object OB output from the object generator 133.

In response to the user command CMD input from the user, the task interpret unit 137 may extract a corresponding execution object OB from at least one execution object OB stored in the object storage unit 135, and may execute the extracted execution object OB.

For example, in response to the user command CMD, the task interpret unit 137 may extract the corresponding execution object OB from the at least one execution object OB with respect to at least one robot task TS stored in the object storage unit 135.

Also, the task interpret unit 137 may execute the execution object OB with respect to the extracted robot task TS. In this case, when a model value of the robot model MD within the execution object OB is required, the task interpret unit 137 may receive a dynamic library DLL from the model binder 125 of the aforementioned binding object 33.

In the meantime, although not shown in figures, the task execution apparatus 30 may further include a task manager. The task manager may control an operation of the task execution unit 35 by interpreting the user command CMD input from the user, and may manage the execution object OB stored in the object storage unit 135.

Figure 5:
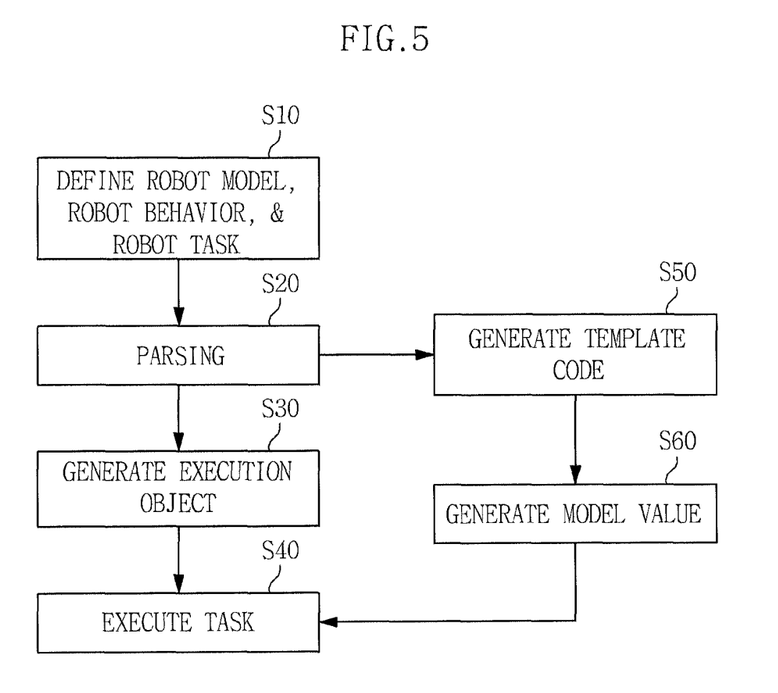
FIG. 5 is a flowchart illustrating a task execution process of a task execution apparatus according to an exemplary embodiment of the present invention.
Figure 6:
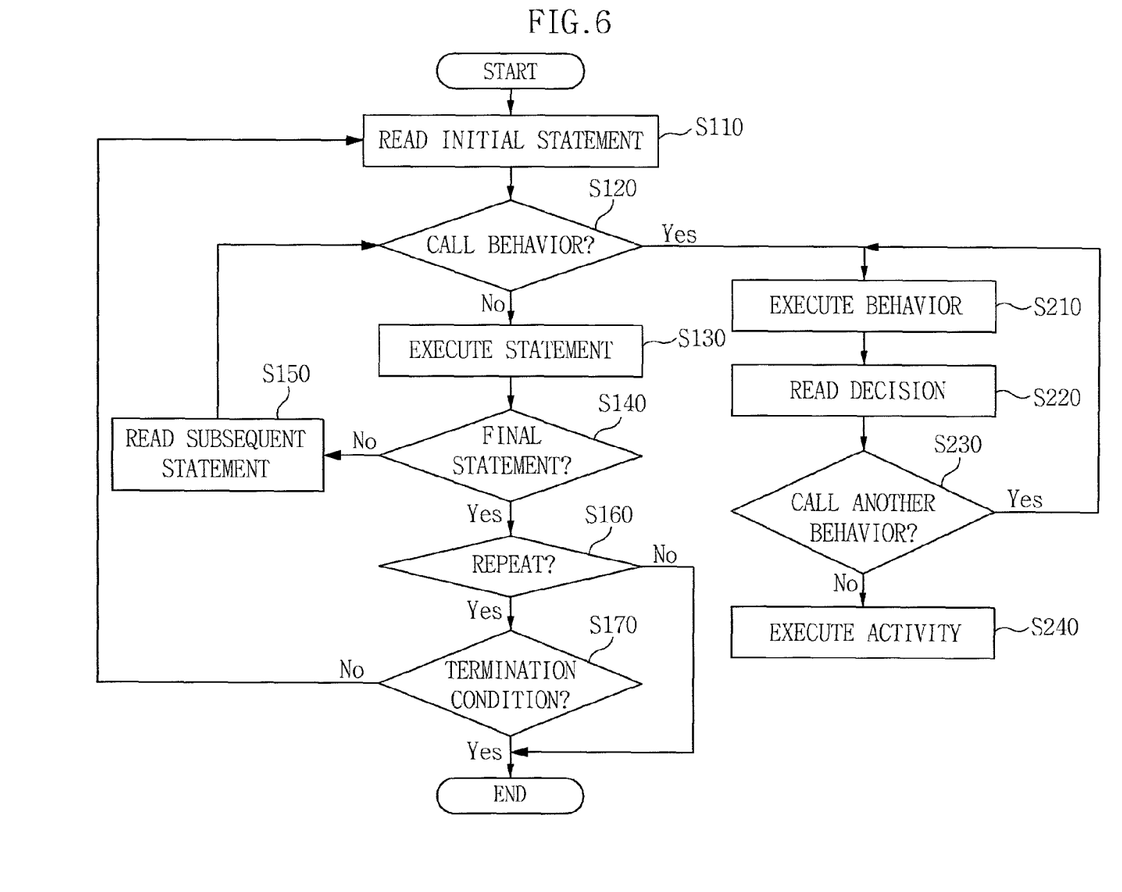
FIG. 6 is a flowchart illustrating a detailed process of a task execution operation of FIG. 5.

FIG. 5 is a flowchart illustrating a task execution process of a task execution apparatus according to an exemplary embodiment of the present invention, and FIG. 6 is a flowchart illustrating a detailed process of a task execution operation of FIG. 5.

Referring to FIG. 1 through FIG. 5, a user may define a robot model MD, a robot behavior BH, and a robot task TS using a plurality of APIs or random information. The storage unit 31 of the task execution unit 35 may store the defined robot model MD, the robot behavior BH, and the robot task TS (S10).

The user may initially define the robot model MD including at least one model, and then subsequently define the robot behavior BH and the robot task TS using the defined robot model MD.

Accordingly, the defined robot behavior BH may include at least one model of the robot model MD, and the defined robot task TS may include at least one model of the robot model MD or the robot behavior BH.

The task execution unit 35 of the task execution apparatus 30 may parse the defined robot model MD, the robot behavior BH, and the robot task TS (S20), and may generate an execution object OB from a parsing result (S30).

The parser 131 of the task execution unit 35 may obtain the robot model MD, the robot behavior BH, and the robot task TS stored in the storage unit 31, and may parse and thereby output them.

In this case, after a user command CMD is input into the task execution apparatus 30 from the user, the parser 131 may obtain, from the storage unit 31, and thereby parse the robot model MD, the robot behavior BH, and the robot task TS corresponding to the user command CMD.

Also, when each of the robot model MD, the robot behavior BH, and the robot task TS is defined by the user and thereby is stored in the storage unit 31, the parser 131 may also obtain them from the storage unit 31 and thereby parse.

The object generator 133 defines a class of each of the robot model MD, the robot behavior BH, and the robot task TS from the parsing result that is output from the parser 131, and thus may generate the execution object OB. The generated execution object OB may be stored in the object storage unit 135.

In the meantime, the parser 131 may generate a template code TC based on the obtained robot model MD, and may output the generated template code TC to the binding object 33 (S50).

The binding object 33 may generate a model value, that is, a dynamic library DLL with respect to the robot model MD, based on the template code TC that is output from the parser 131 (S60).

When a request is received from the task interpret unit 137, the model binder 125 of the binding object 33 may output the generated dynamic library DLL to the task interpret unit 137.

In response to the user command CMD input from the user, the task interpret unit 137 may extract a corresponding execution object OB from at least one execution object OB stored in the object storage unit 135.

Next, the task interpret unit 137 may execute a task desired by the user by executing the extracted execution object OB (S40).

In this case, the task interpret unit 137 may execute a robot task which the user would like to execute by executing a robot task TS included in the extracted execution object OB, that is, a robot task TS defined by the user.

In the meantime, when the task interpret unit 137 needs a model value with respect to the defined robot model MD while executing the execution object OB, the task interpret unit 137 may receive the necessary model value, that is, the dynamic library DLL of the robot model MD from the model binder 125 of the binding object 33.

Hereinafter, the aforementioned task execution operation in the task execution apparatus 30 will be further described with reference to FIG. 6.

Referring to FIG. 1 through FIG. 4, and FIG. 6, in response to a user command CMD, the task interpret unit 137 of the task execution apparatus 30 may extract a single corresponding execution object OB from at least one execution object OB stored in the object storage unit 135, and may execute a robot task TS within the extracted execution object OB.

In this case, the robot task TS of the extracted execution object OB may include a plurality of syntaxes, that is, a plurality of statements. Also, a robot behavior BH or a robot model MD of the extracted execution object OB may include the plurality of statements. At least one function statement may be included in a single statement of the robot task TS.

The task interpret unit 137 may read an initial statement from the robot task TS of the extracted execution object OB (S110).

In this case, the task interpret unit 137 may determine whether the read statement is calling a behavior of a robot, that is, the robot behavior BH (S120), and may execute the robot behavior BH associated with the statement of the robot task TS (S210) or may execute the statement of the robot task TS depending on the decision result (S130).

After the statement of the robot task TS is executed according to the decision result, the task interpret unit 137 may determine an order of the executed statement within the robot task TS (S140).

In this case, the order decision of the executed statement within the robot task TS may be omitted depending on embodiments.

When the executed statement corresponds to a final statement of the robot task TS based on the decision result, the task interpret unit 137 may determine whether the executed statement is repeatedly performed (S160).

For example, the task interpret unit 137 may determine whether a repeat function is included in the executed statement.

In this case, when the repeat function is included in the executed statement, the task interpret unit 137 may determine a termination condition, for example, whether the executed statement satisfies the repeat function (S170), and may repeatedly perform the statement (S110) or terminate the statement depending on the decision result.

For example, when the repeat function is not included in the executed statement, the task interpret unit 137 may terminate the statement.

In the meantime, when the executed statement does not correspond to the final statement of the robot task TS based on the decision result of the task interpret unit 137, the task interpret unit 137 may read a subsequent statement of the robot task TS (S150), and may determine whether the read statement calls the robot behavior BH (S120).

In addition, when the statement read by the task interpret unit 137 is calling the robot behavior BH, the task interpret unit 137 may execute the robot behavior BH associated with the read statement (S210) and may read a decision of the robot behavior BH (S220).

When the decision calls another robot behavior BH based on a decision reading result, the task interpret unit 137 may execute the other robot behavior BH (S210).

However, when at least one activity associated with the decision is defined without calling the other robot behavior BH based on the decision reading result, the task interpret unit 137 may execute a corresponding activity (S240).

For example, the decision of the robot behavior BH defined by the user may include a plurality of condition functions, that is, 'if' function statements, and may include a plurality of activities connected thereto.

Accordingly, the task interpret unit 137 may execute a corresponding activity by determining a requirement of each 'if' function statement of the read decision.

Accordingly, the task execution apparatus 30 may generate a control signal CNT based on the executed activity, and may control an operation of the robot, for example, an operation of the apparatus unit 20 using the control signal CNT.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Accordingly, the actual technical protection scope of the present invention must be determined by the spirit of the appended claims.

What is claimed is:

1. An apparatus for executing a robot task, the apparatus comprising:
    a storage unit to store at least one robot model, at least one robot behavior, and at least one robot task; and
    a task execution unit to generate at least one execution object from the stored at least one robot model, at least one robot behavior, and at least one robot task, and to execute a task of a robot from a corresponding execution object among the generated at least one execution object in response to an execution command input from a user.

2. The apparatus of claim 1, wherein the task execution unit generates the execution object by extracting a robot model, a robot behavior, and a robot task corresponding to the execution command from the stored at least one robot model, at least one robot behavior, and at least one robot task, when the execution command is input.

3. The apparatus of claim 1, wherein the task execution unit generates the at least one execution object from the at least one robot model, at least one robot behavior, and at least one robot task after the at least one robot model, at least one robot behavior, and at least one robot task are stored.

4. The apparatus of claim 1, wherein the task execution unit further includes:
    a parser to parse the stored at least one robot model, at least one robot behavior, and at least one robot task.

5. The apparatus of claim 4, wherein the task execution unit generates the at least one execution object from the parsed at least one robot model, at least one robot behavior, and at least one robot task that are output from the parser.

6. The apparatus of claim 1, wherein the task execution unit further includes:

an object storage unit to store the generated at least one execution object.

7. The apparatus of claim 1, wherein the task execution unit generates a template code from the at least one robot model, and further comprising a binding object to generate a dynamic library of the at least one robot model from the template code.

8. The apparatus of claim 7, wherein the binding object outputs the dynamic library to the task execution unit according to a request of the task execution unit.

9. The apparatus of claim 1, wherein the at least one robot behavior and the at least one robot task are defined based on the at least one robot model.

10. The apparatus of claim 1, wherein the at least one robot model is defined based on an obtained robot application programming interface (API).

11. A method of executing a robot task, the method comprising:

generating at least one execution object from stored at least one robot model, at least one robot behavior, and at least one robot task; and executing a task of a robot from a corresponding execution object among the at least one execution object in response to an execution command input from a user.

12. The method of claim 11, wherein the generating at least one execution object generates the execution object by extracting a robot model, a robot behavior, and a robot task corresponding to the execution command from the stored at least one robot model, at least one robot behavior, and at least one robot task when the execution command is input.

13. The method of claim 11, wherein the generating at least one execution object generates the at least one execution object from the stored at least one robot model, at least one robot behavior, and at least one robot task after the at least one robot model, at least one robot behavior, and at least one robot task are stored.

14. The method of claim 11, wherein the generating at least one execution object parses the stored at least one robot model, at least one robot behavior, and at least one robot task, and generates the at least one execution object from the parsed at least one robot model, at least one robot behavior, and at least one robot task.

15. The method of claim 11, further comprising:

generating a template code from the one robot model;

generating a dynamic library of the robot model from the template code; and obtaining a model value of the robot model based on the dynamic library.

16. The method of claim 11, wherein the executing the task of the robot includes:

reading an initial statement among at least one statement of the robot task from the execution object;

executing a called robot behavior when the read initial statement calls the called robot behavior;

determining whether the initial statement corresponds to a repeat condition when the read initial statement does not call the called robot behavior; and repeatedly executing the initial statement when the initial statement corresponds to the repeat condition.

17. The method of claim 16, wherein the executing the called robot behavior determines a decision of the called robot behavior, and executes an activity of the robot behavior corresponding to the decision according to a decision result.

18. The method of claim 16, wherein the repeatedly executing the initial statement further comprises:

determining an order of the initial statement in the robot task; and performing a subsequent statement or determining the repeat condition of the initial statement depending on a decision result.

19. The method of claim 11, wherein the at least one robot behavior and the at least one robot task are defined based on the at least one robot model.

20. The method of claim 11, wherein the at least one robot model is defined based on an obtained robot API.

* * * * *